United States Patent
Liu et al.

(10) Patent No.: US 12,225,449 B2
(45) Date of Patent: Feb. 11, 2025

(54) METHOD, APPARATUS AND SYSTEM FOR WIRELESS INTELLIGENT DECISION-MAKING COMMUNICATION

(71) Applicant: SHENZHEN CONSYS SCIENCE & TECHNOLOGY CO., LTD., Shenzhen (CN)

(72) Inventors: Jiande Liu, Shenzhen (CN); Hongjian Liang, Shenzhen (CN); Xianqing Ma, Shenzhen (CN); Shusheng Li, Shenzhen (CN)

(73) Assignee: SHENZHEN CONSYS SCIENCE & TECHNOLOGY CO., LTD., Shenzhen (CN)

( * ) Notice: Subject to any disclaimer, the term of this patent is extended or adjusted under 35 U.S.C. 154(b) by 668 days.

(21) Appl. No.: 17/469,642

(22) Filed: Sep. 8, 2021

(65) Prior Publication Data

US 2022/0240162 A1    Jul. 28, 2022

Related U.S. Application Data

(63) Continuation of application No. PCT/CN2021/086679, filed on Apr. 12, 2021.

(30) Foreign Application Priority Data

Jan. 22, 2021    (CN) .......................... 202110084903.2

(51) Int. Cl.
*H04W 48/14*    (2009.01)
*H04W 28/18*    (2009.01)
(Continued)

(52) U.S. Cl.
CPC ........... *H04W 48/14* (2013.01); *H04W 28/18* (2013.01); *H04W 48/16* (2013.01)

(58) Field of Classification Search
CPC ...... G06N 20/00; G06N 3/08; H04B 17/3913; H04L 25/0254; H04W 72/21
See application file for complete search history.

(56) References Cited

U.S. PATENT DOCUMENTS

| 10,396,919 B1* | 8/2019 | O'Shea | ................. H04B 17/373 |
| 2010/0046460 A1* | 2/2010 | Kwak | .................... H04W 72/21 |
| | | | 714/E11.131 |

(Continued)

FOREIGN PATENT DOCUMENTS

| CN | 101931584 A | 12/2010 |
| CN | 102025680 A | 4/2011 |

(Continued)

OTHER PUBLICATIONS

"Use cases, AI/ML algorithms, and general concepts." Electronic meeting #110-e; Nov. 2-13, 2020; pp. 1-6; Intel Corporation.

(Continued)

*Primary Examiner* — Yee F Lam

(57) ABSTRACT

Embodiments of the present application provide a method, an apparatus and a system for wireless intelligent decision-making communication, where the method includes: obtaining data information of a network node; where the data information includes scheduling request information, resource pre-occupancy indication information, network status information, wireless channel information, and communication capability information of the network node; predicting an application scenario of the network node at a preset time according to the data information; determining a decision result containing a multi-domain combination according to the application scenario of the network node at the preset time and the communication capability information of the network node, and activating the multi-domain combination of the network node at the preset time; where (Continued)

the multi-domain combination is corresponding to the application scenario of the network node.

21 Claims, 7 Drawing Sheets

(51) Int. Cl.
*H04W 48/16* (2009.01)
*H04W 48/18* (2009.01)

(56) References Cited

U.S. PATENT DOCUMENTS

| | | | |
|---|---|---|---|
| 2012/0044812 A1* | 2/2012 | Hiddink | H04W 72/21 370/330 |
| 2012/0113914 A1* | 5/2012 | Zhao | H04L 5/0091 370/329 |
| 2012/0134287 A1 | 5/2012 | Turunen et al. | |
| 2017/0195456 A1 | 7/2017 | Ohlen et al. | |
| 2017/0230164 A1 | 8/2017 | Zhang | |
| 2017/0369168 A1 | 12/2017 | Hwang et al. | |
| 2018/0157978 A1 | 6/2018 | Buda et al. | |
| 2018/0288740 A1* | 10/2018 | Ansari | H04W 16/10 |
| 2019/0230046 A1 | 7/2019 | Djukic et al. | |
| 2019/0364492 A1* | 11/2019 | Azizi | H04W 52/0264 |
| 2020/0174471 A1 | 6/2020 | Du et al. | |
| 2020/0195506 A1 | 6/2020 | Peng | |
| 2020/0266910 A1* | 8/2020 | O'Shea | G06N 3/045 |
| 2020/0292706 A1 | 9/2020 | Hexsel et al. | |

FOREIGN PATENT DOCUMENTS

| | | |
|---|---|---|
| CN | 103516654 A | 1/2014 |
| CN | 105282195 A | 1/2016 |
| CN | 107889251 A | 4/2018 |
| CN | 107967311 A | 4/2018 |
| CN | 108092740 A | 5/2018 |
| CN | 108574591 A | 9/2018 |
| CN | 108900980 A | 11/2018 |
| CN | 109699037 A | 4/2019 |
| CN | 109960395 A | 7/2019 |
| CN | 110138421 A | 8/2019 |
| CN | 111031558 A | 4/2020 |
| CN | 111162547 A | 5/2020 |
| CN | 111294234 A | 6/2020 |
| CN | 111417194 A | 7/2020 |
| CN | 111741452 A | 10/2020 |
| CN | 111797867 A | 10/2020 |
| CN | 112423324 A | 2/2021 |
| EP | 3419188 A1 | 12/2018 |
| WO | 2019/114959 A1 | 6/2019 |
| WO | 2020150102 A1 | 7/2020 |

OTHER PUBLICATIONS

European Search Report dated May 19, 2022 for European Patent Application No. 21761959.2.

The Decision to Grant a Patent for Japanese Patent Application No. 2021-576899, dated Jul. 18, 2023.

* cited by examiner

| Frame control | Address format | Frame body |

FIG. 4(a)

| Protocol type | Protocol version | Address format | Other reserved frame control functions |

FIG. 4(b)

| Frame control | Network autonomous decision-making node address | Receiving address | Sending address | Extended address | Sequence control | Service quality control | Frame body | Checksum |

FIG. 4(c)

METHOD, APPARATUS AND SYSTEM FOR WIRELESS INTELLIGENT DECISION-MAKING COMMUNICATION

CROSS-REFERENCE TO RELATED APPLICATIONS

This application is a continuation of International Application No. PCT/CN2021/086679, filed on Apr. 12, 2021, which claims priority to Chinese Application No. 202110084903.2, filed to the China National Intellectual Property Administration on Jan. 22, 2021 and entitled "Method, Apparatus and System for Wireless Intelligent Decision-Making Communication". The disclosures of the aforementioned applications are hereby incorporated by reference in their entireties.

TECHNICAL FIELD

The present application relates to the technical field of wireless communication technology and, in particular, to a method, an apparatus and a system for wireless intelligent decision-making communication.

BACKGROUND

With the development of communication technology, methods for preset transformation processing and scheduling of a wireless electromagnetic wave signal and information have gradually increased, and a variety of wireless communication protocols have been formed.

In prior art, various wireless communication network resources are suitable for a specific application scenario respectively. For example, the 3rd Generation Partnership Project (3GPP) Long Term Evolution (LTE) protocol based on orthogonal frequency division multiplexing technology is suitable for land low-speed mobile communication, and the unified forwarding ad hoc network protocol based on time division multiplexing technology is suitable for scenarios with high proportion of broadcast multicast services. However, when the network node moves or the network state and environment change, an original single network protocol will show a disadvantage. Therefore, it is necessary to propose a decision-making communication method for wireless network resources to solve problems that resources cannot be intelligently switched when the application scenarios of current network nodes change, resulting in small network capacity and throughput, which cannot meet requirements of users.

SUMMARY

The present application provides a method, an apparatus and a system for wireless intelligent decision-making communication to solve the problem that resources cannot be intelligently switched when application scenarios of a network node change, and to solve the problem that network capacity and throughput are small and unable to meet requirements of users.

In a first aspect, an embodiment of the present application provides a method for wireless intelligent decision-making communication, which includes:

obtaining data information of a network node; where the data information includes scheduling request information, resource pre-occupancy indication information, network status information, wireless channel information, and communication capability information of the network node;

predicting an application scenario of the network node at a preset time according to the data information; and determining a decision result containing a multi-domain combination according to the application scenario of the network node at the preset time and the communication capability information of the network node, and activating the multi-domain combination of the network node at the preset time; where the multi-domain combination is corresponding to the application scenario of the network node.

Optionally, predicting the predicting an application scenario of the network node at a preset time according to the data information includes:

predicting deterministic change information of the network node according to the data information; and determining the application scenario of the network node according to the deterministic change information.

Optionally, the determining a decision result including a multi-domain combination according to the application scenario of the network node at the preset time and the communication capability information of the network node includes:

inputting the application scenario of the network node at the preset time and the communication capability information of the network node into a reinforcement learning model, and determining an output result of the reinforcement learning model as the decision result.

Optionally, the determining a decision result including a multi-domain combination according to the application scenario of the network node at the preset time and the communication capability information of the network node includes:

when the network node is in a static application scenario, and the communication capability information of the network node contains time domain resources and frequency domain resources, the multi-domain combination includes the time domain resources and frequency domain resources of the network node; or when the network node is in a moving application scenario and the communication capability information of the network node contains the time domain resources, the frequency domain resources and space domain resources, the decision result is activating the time domain resources, the frequency domain resources and the space domain resources of the network node; or when the network node is in an application scenario with interference and the communication capability information of the network node contains the time domain resources, the frequency domain resources, the space domain resources and code domain resources, the decision result is activating the time domain resources, the frequency domain resources, the space domain resources and the code domain resources of the network node; or when the network node is in an application scenario with multiple obstacles and the communication capability information of the network node contains the time domain resources, the frequency domain resources, the space domain resources, the code domain resources and time-delay Doppler domain resources, the decision result is activating the time domain resources, the frequency domain resources, the space domain resources, the code domain resources and the time-delay Doppler domain resources of the network node.

Optionally, the method is applied to the network node, and the network node predicts the application scenario of the network node through a convolutional long-short-term memory hybrid neural network model, and the network node determines the multi-domain combination to be activated through a reinforcement learning model.

Optionally, the obtaining data information of a network node includes:

obtaining, by a network autonomous decision-making node, the data information of the network node;

correspondingly, the predicting an application scenario of the network node at a preset time according to the data information includes:

predicting, by the network autonomous decision-making node, the application scenario of the network node at the preset time; and correspondingly, the determining a decision result including a multi-domain combination according to the application scenario of the network node at the preset time and the communication capability information of the network node, and activating the multi-domain combination of the network node at the preset time includes:

determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

Optionally, the obtaining data information of a network node includes:

obtaining, by a cloud scheduling component and the network autonomous decision-making node, the data information of the network node respectively; where the data information obtained by the cloud scheduling component is first data information, and the data information obtained by the network autonomous decision-making node is second data information; where the first data information is long period data information, and the second data information is short period data information;

correspondingly, the predicting an application scenario of the network node at a preset time according to the data information includes:

predicting, by the cloud scheduling component, a first application scenario of the network node at the preset time; and predicting, by the network autonomous decision-making node, a second application scenario of the network node at the preset time;

correspondingly, the determining a decision result including a multi-domain combination according to the application scenario of the network node at the preset time and the communication capability information of the network node, and activating the multi-domain combination of the network node at the preset time includes:

determining, by the cloud scheduling component, a first decision result according to the first application scenario and the communication capability information of the network node;

determining, by the network autonomous decision-making node, a second decision result according to an obtained second application scenario and the communication capability information of the network node; and determining, by the network autonomous decision-making node, a third decision result according to the first decision result and the second decision result, and sending the third decision result to the network node through the unified scheduling management protocol frame, to enable the network node to activate the multi-domain combination in the third decision result at the preset time.

Optionally, the cloud scheduling component and the network autonomous decision-making node both include a unified scheduling management module and at least one protocol conversion module; and the obtaining, by a cloud scheduling component and the network autonomous decision-making node, the data information of the network node respectively includes:

when a network type of the cloud scheduling component or the network autonomous decision-making node is inconsistent with a network type used by the network node transmitting data, switching, by the cloud scheduling component or the network autonomous decision-making node, the network type to a network type which is in line with the network node through the protocol conversion module; and correspondingly, predicting a first application scenario of the network node at the preset time through the cloud scheduling component includes:

determining, by the unified scheduling management module in the cloud scheduling component, the first decision result according to the first application scenario; and correspondingly, the predicting, by the network autonomous decision-making node, a second application scenario of the network node at the preset time includes:

determining, the unified scheduling management module in the network autonomous decision-making node, the second decision result according to the second application scenario.

Optionally, the cloud scheduling component and the network autonomous decision-making node both include a data storage module, and the method further includes:

storing, by the cloud scheduling component and the network autonomous decision-making node, the communication capability information of the network node in a blockchain; and storing, by the data storage module, the network status information, the wireless channel information, the scheduling request information, and the resource pre-occupancy indication information reported by the network node in a time sequence.

In a second aspect, an embodiment of the present application provides an apparatus for wireless intelligent decision-making communication, which is used for implementing the method described in the first aspect, which includes:

an obtaining module, configured to obtain data information of each network node; where the data information includes scheduling request information, resource pre-occupancy indication information, network status information, wireless channel information, and communication capability information of the network node; and a predicting module, configured to predict, for a network node, the scenario of the network node at the preset time according to the data information; and an activating module, configured to determine a decision result containing a multi-domain combination according to the application scenario of the network node at the preset time and the communication capability information of the network node, and activate the multi-domain combination of the network node at the preset time; where the multi-domain combination is corresponding to the application scenario of the network node.

In a third aspect, an embodiment of the present application provides a system for wireless intelligent decision-making communication, which is used for implementing the method described in the first aspect, where the system includes: a network autonomous decision-making node and a network node;

the network node is configured to send data information to the network autonomous decision-making node; the data information includes scheduling request information, resource pre-occupancy indication information, network status information, wireless channel information and communication capability information of the network node;

the network autonomous decision-making node is configured to obtain the data information of the network node, predict the application scenario of the network node at the preset time, and determine the decision result according to the application scenario and the communication capability information of the network node; and the network autonomous decision-making node is further configured to send the decision result to the network node through the unified scheduling management protocol frame to enable the network node to activate the multi-domain combination in the decision result at the preset time.

In a fourth aspect, an embodiment of the present application provides a system for wireless intelligent decision-making communication, which is used for implementing the method described in the first aspect, where the system includes: a network autonomous decision-making node, a cloud scheduling component and a network node; and the cloud scheduling component is configured to determine a first application scenario according obtained first data information, and determine a first decision result according to the first application scenario;

the network autonomous decision-making node is configured to determine a second application scenario according to obtained second data information, and determine a second decision result according to the second application scenario; and the network autonomous decision-making node determines a third decision result according to the first decision result and the second decision result, and send the third decision result to the network node through an unified scheduling management protocol frame, to enable the network node to activate the multi-domain combination in the third decision result at the preset time;

where the first data information is long period data information; and the second data information is short period data information.

The embodiments of the present application provide the method, the apparatus and the system for wireless intelligent decision-making communication, where the method includes: obtaining data information of a network node; where the data information includes scheduling request information, resource pre-occupancy indication information, network status information, wireless channel information, and communication capability information of the network node; predicting an application scenario of the network node at a preset time according to the data information; determining a decision result containing a multi-domain combination according to the application scenario of the network node at the preset time and the communication capability information of the network node, and activating the multi-domain combination of the network node at the preset time; where the multi-domain combination is corresponding to the application scenario of the network node. The above method predicts the scenario in which the network node is located and determines the multi-domain combination to be activated according to the scenario where the network node is located, so that the network node can adapt to changes of application scenarios, thereby maximizing network capacity and throughput to meet requirements of users.

BRIEF DESCRIPTION OF DRAWINGS

To illustrate the technical solutions in the embodiments of the present application or the prior art more clearly, the following will briefly introduce the accompanying drawings to be used in the description of the embodiments or the prior art, obviously, the accompanying drawings in the following description are only some of the embodiments of the present application, and other accompanying drawings can be obtained according to these accompanying drawings without creative effort for those of ordinary skilled in the art.

FIG. 4(*a*) is a schematic structural diagram of a unified scheduling management protocol frame provided by an embodiment of the present application;

FIG. 4(*b*) is a schematic structural diagram of a frame control field provided by an embodiment of the present application;

FIG. 4(*c*) is a schematic structural diagram of another unified scheduling management protocol frame provided by an embodiment of the present application;

DESCRIPTION OF EMBODIMENTS

The technical solutions in the embodiments of the present application will be clearly and completely described below with reference to the accompanying drawings in the embodiments of the present application. Apparently, the described embodiments are only part of the embodiments of the present application, rather than all of the embodiments. On the basis of the embodiments of the present application, all other embodiments obtained by those of ordinary skilled in the art without creative work fall within the protection scope of the present application.

The terms "first", "second", "third", "fourth" and the like (if any) in the specification and claims and the above accompanying drawings of the present application are used for distinguishing similar objects, and are not necessarily used for describing a particular order or sequence. It should be understood that the data used in this way may be interchanged as appropriate, so that the embodiments of the present application described herein can be implemented, for example, in a sequence other than those illustrated or described herein. In addition, the terms "comprise", and "include" and any variations thereof are intended to cover a non-exclusive inclusion, for example, a process, a method, a system, a product or a device that includes a series of steps or units is not necessarily limited to those steps or units clearly listed, but may include other steps or units that are not explicitly listed or that are inherent to such processes, methods, products or devices.

Figure 1:
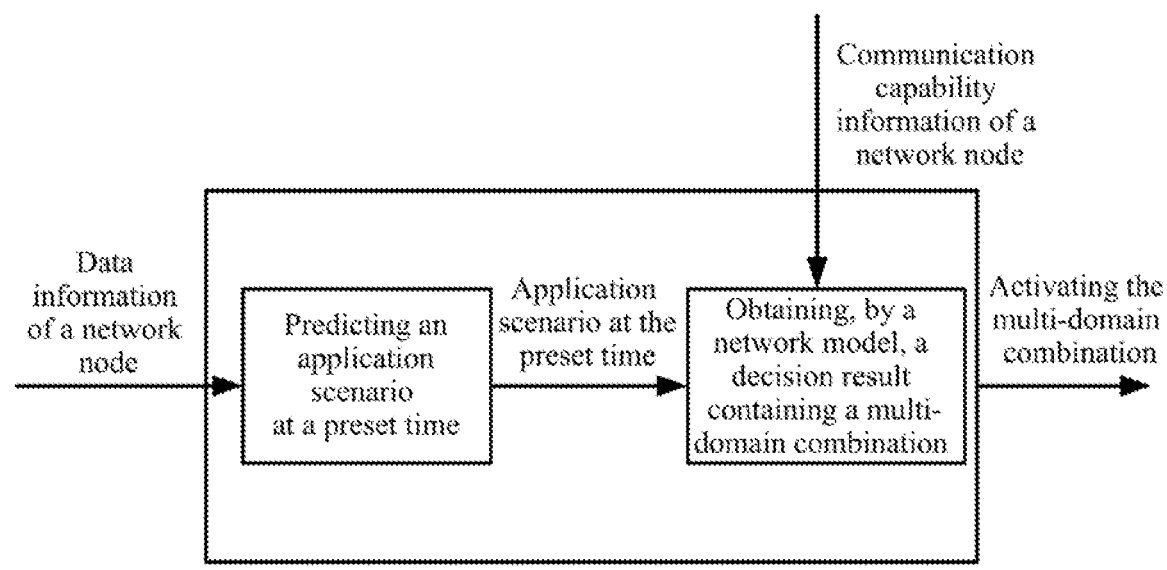
FIG. 1 is a schematic diagram of an application scenario provided by an embodiment of the present application.

FIG. 1 is a schematic diagram of an application scenario provided by an embodiment of the present application. As shown in FIG. 1, the method can be applied to a network node, can also be applied to a network autonomous decision-making node, or can also be applied to a cloud scheduling component and a network autonomous decision-making node. Where the network node can be a base station, an access point, a user terminal, an ad hoc network node, a gateway, etc. By obtaining data information of a network node, the application scenario of the network node at a certain time in the future can be predicted, and the resources of five domains of the network can be autonomously switched and managed according to the application scenario. Where the five domains here refer to the time domain, the frequency domain, the space domain, the code domain and the time-delay Doppler domain. For a network node, after obtaining data information, the application scenario of the network node can be predicted according to the data information, and the corresponding multi-domain combination can be activated according to the application scenario.

In some technologies, network resources cannot be intelligently switched in time when network status and environment of a network node change, and an original single network protocol still is maintained for communication, resulting in small network capacity and throughput, which cannot meet requirements of users.

Based on the above problems, the embodiment of the present application can automatically perceive the application scenario according to obtained data information, then determine a multi-domain combination to be activated according to the application scenario, and activate the multi-domain combination at a preset time. A modified multi-domain combination can meet the communication requirements of the network node, which increases network capacity and throughput, and then meet the usage requirements of users.

The technical solution of the present application is described in detail below in terms of specific embodiments. These specific embodiments below can be combined with each other, and the same or similar concepts or processes may not be repeated in some embodiments.

Figure 2:
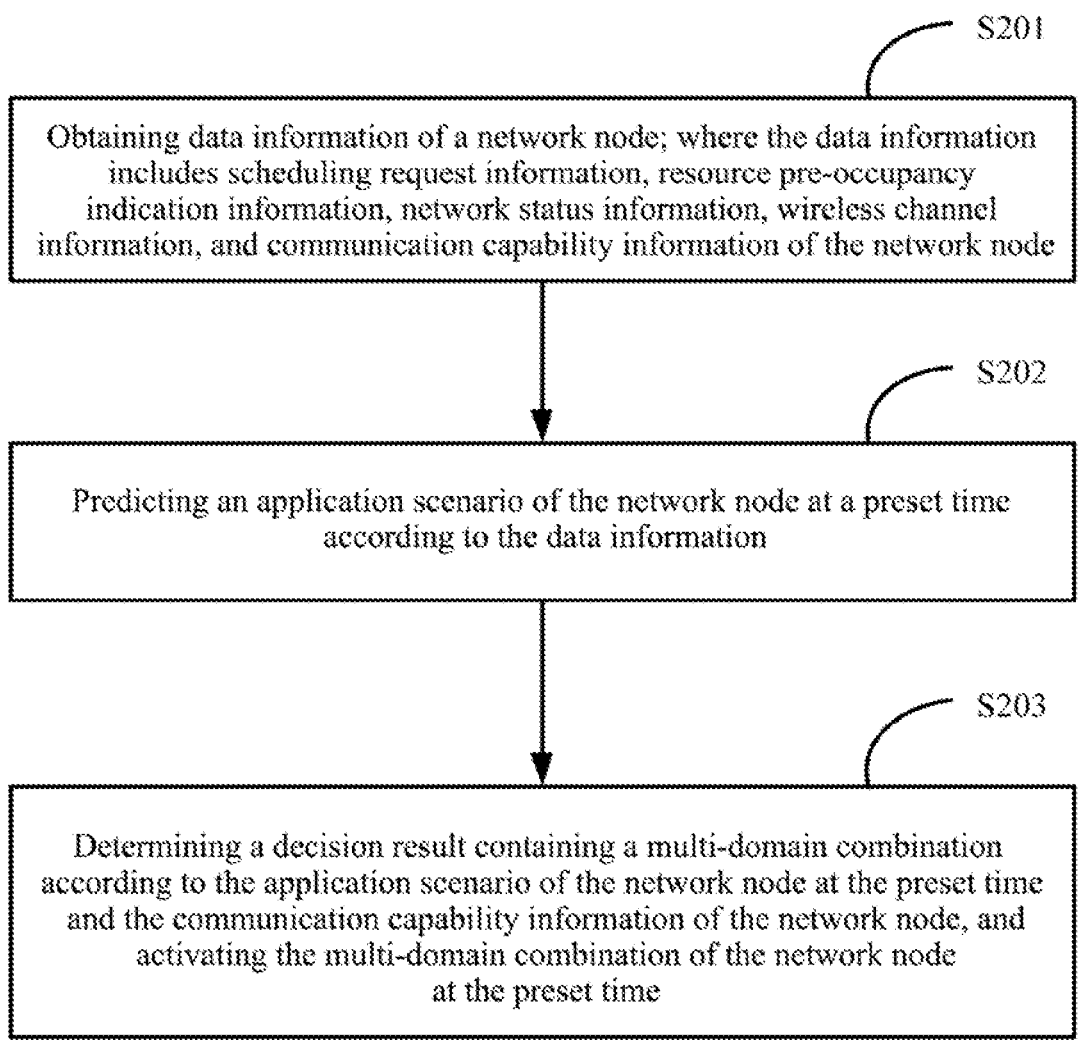
FIG. 2 is a schematic flowchart of a method for wireless intelligent decision-making communication provided by an embodiment of the present application.

FIG. 2 is a schematic flowchart of a method for wireless intelligent decision-making communication provided by an embodiment of the present application. As shown in FIG. 2, the method includes:

S201: obtaining data information of a network node; where the data information includes scheduling request information, resource pre-occupancy indication information, network status information, wireless channel information, and communication capability information of the network node.

In this embodiment, a subject for obtaining data information can be a network node, a network autonomous decision-making node, or a network autonomous decision-making node and a cloud scheduling component. When the subject for obtaining data information is a network node, a centerless ad hoc network communication method is formed, in which each network node is a network autonomous decision-making node, and the decision result is determined by a collaborative mechanism between each network autonomous decision-making node. When the subject for obtaining data information is a network autonomous decision-making node, a distributed network communication method is formed and the network autonomous decision-making node can obtain data information of all network nodes in this area and determine a decision result. When the subject for obtaining data information is the network autonomous decision-making node and the cloud scheduling component, a centralized network communication method is formed, a second-level scheduling is realized through the cloud scheduling component and the network autonomous decision-making node, and a decision result is finally determined.

Where the obtained data information of the network node is multi-dimensional information. Data information can include scheduling request information, resource pre-occupancy indication information, network status information and wireless channel information. The obtained network status information includes, but is not limited to, information of number of network nodes, occupation of air interface resources, a proportion of different types of services, communication rate, packet loss rate, distance to other network nodes and signal strength, etc. The obtained wireless channel information includes a transmission channel from a sender to a receiver when the nodes communicate with each other. The obtained scheduling request information can be the amount of data requested to be sent, the size of received cache, etc. The resource pre-occupancy indication information can be indication information of resource reservation occupancy.

Where the obtaining data information of a network node can be that obtaining the data information by sending request data to other nodes and can also by receiving data information actively sent by other nodes according to agreement.

Where communication capability information of the network node is related to a hardware accelerator and radio frequency resources of the network node itself, and different network nodes have different communication capability information. Only when the network node supports a certain domain resource, the corresponding resource be activated.

The following takes the acquisition of air interface resources as an example for description. The network node can obtain continuous frame data, if the frame data contains 100 slots, where the first 10 slots represent control scheduling information, and any node can obtain the frame data, after the frame data is obtained, the frame data can be parsed to obtain the data of the first 10 slots, and the occupancy of time-frequency resources can be obtained from the data of the first 10 slots, for example, when it is known from the frame data that the time-frequency resource A is occupied, the node cannot transmit data through the time-frequency resource A.

In addition, the communication capability information of itself can also be obtained, which includes, but is not limited to, network node identification, network node type, whether it supports relay, whether it can move and range of movement, supported protocol types, supported frequency bands, MIMO (Multi Input Multi Output, multi input multi output) capability, multi-carrier capability, carrier aggregation capability, etc. The communication capability information here is the information of all communication capabilities supported by the node. Network node types can be a base station, an access point, a user terminal, a gateway, a relay node, etc.

After the above multi-dimensional data information is obtained, the above data information can also be saved.

S202: predicting an application scenario of the network node at a preset time according to the data information.

In this embodiment, an application scenario at a preset time can be predicted according to the obtained data information. Specifically, the prediction can be performed according to the obtained data information, for example, when it is detected that interference will occur in certain areas in the future, it can be determined that the network node is in an interference application scenario. Specifically, the application scenario of the network node is determined through the obtained scheduling request information, resource pre-occupancy indication information, network status information, and wireless channel information.

S203: determining a decision result containing a multi-domain combination according to the application scenario of the network node at the preset time and the communication capability information of the network node, and activating the multi-domain combination of the network node at the preset time; where the multi-domain combination is corresponding to the application scenario of the network node.

In this embodiment, a multi-domain combination to be activated can be determined according to the application scenario of the network node, after determining the application scenario of the network node at a preset time and the communication capability information of the network node, so that the activated multi-domain combination can adapt to the application scenario of the network node at the preset time. For example, when the application scenario of the network node at a preset time is scenario A and there is no need to activate five-domain resources at the same time under the scenario A, only the resources of the multi-domain combination corresponding to the scenario can be activated at this time. For example, when a wireless communication protocol of orthogonal frequency division multiple access is required, only the corresponding time domain resources and frequency domain resources can be activated, thereby maximizing the network capacity and throughput while reducing power consumption, when the application scenario of the network node changes.

Where the time domain resources, the frequency domain resources, the space domain resources, the code domain resources and the time-delay Doppler domain resources will correspond to different software and hardware accelerators respectively, activation of the multi-domain combination resources refers to the software and hardware accelerators corresponding to the multi-domain combination being in a working state, that is, the corresponding software being in a loading and running state and the hardware accelerator being in a powered state. Where the nature of the programs corresponding to the five-domain resources are different mathematical transformation methods, and programs in the running state can perform the corresponding transformation processes on the data to be transmitted to realize the data transmission through the corresponding multi-domain combination method. Where a hardware accelerator is not a necessary device, and the performance of data processing can be improved by using a hardware accelerator.

In this embodiment, a network node or a cloud scheduling component or a network autonomous decision-making node can obtain data information of a network node, predict an application scenario of the network node at a preset time according to the obtained data information, activate a multi-domain combination of the network node according to the application scenario, and can autonomously switch and manage the time domain resources, frequency domain resources, space domain resources, code domain resources and time-delay Doppler domain resources of the network to adapt to the changes of application scenarios and maximize the network capacity and throughput.

Optionally, the predicting an application scenario of the network node at a preset time according to the data information includes:

predicting deterministic change information of the network node according to the data information; and determining the application scenario of the network node according to the deterministic change information.

In this embodiment, deterministic change information of the network node can be determined according to the data information before the application scenario is determined according to the data information. Specifically, the prediction can be performed by using a convolutional long-short-term memory hybrid neural network. The scheduling request information, the resource pre-occupancy indication information, the network status information, the wireless channel information of the network node in the local or global region are used as input data, and the convolutional long-short-term memory hybrid neural network processes the input data and output deterministic changing cycles, cyclic patterns, trends and models of stochastic changes, etc.

For example, when the network used by a network node is a single carrier network, the number of user terminals and network nodes can be obtained according to the network state information and the wireless channel information, and the situation of the air interface resource occupancy can be obtained according to the scheduling request information and the resource pre-occupancy indication information, whether the number of user terminals and the number of network nodes will exceed the preset value in the future time can be predicted by the neural network model, and whether the occupancy rate of the air interface resources of the network node will exceed a preset value. And the predicted information is deterministic change information.

The neural network uses a convolutional long-short-term memory hybrid neural network, which is a combination of the convolution layer and the pooling layer of the convolutional neural network and the input layer of the long-short-term memory neural network, which extracts local features through the convolution layer and pooling layer, and then obtains features related to time sequence in the local features through the long-short-term memory neural network, thus, the memory and prediction of short-term or long-term data can be achieved.

Where the convolutional long-short-term memory hybrid neural network needs to be trained by historical data, before using it to predict the deterministic change information of the network node. Where the historical data are historical scheduling request information, historical resource pre-occupancy indication information, historical network status information, historical wireless channel information and the historical network change information under the historical scheduling request information, the historical resource pre-occupancy indication information, the historical network status information and the historical wireless channel information. By inputting the above historical data into the preset network model and after multiple trainings, the determined neural network model is obtained. Where a lot of historical data need to be input during the trainings.

By combining the two neural networks, the advantages of the convolutional neural network and the long- and short-term memory network can be used at the same time to obtain a highly accurate prediction result.

After obtaining deterministic change information, an application scenario of the network node can be obtained according to the deterministic change information, and the application scenario of the network node can be a stationary application scenario, a mobile application scenario, etc. The application scenario of the network node can be determined according to features in the deterministic change information of the network node. For example, when the deterministic change information shows that there will be fixed interference or random interference at a certain time in the next hour, the application scenario of the network node can be determined as the application scenario with the interference.

Through the above method, an application scenario of a network node can be determined according to the data information of the network node. Firstly, deterministic change information of the network node is predicted, and then the application scenario is predicted to make the determined application scenario more accurate. The data information with a time sequence relationship can be processed well by using the convolutional long-short-term memory hybrid neural network.

Optionally, the determining a decision result including a multi-domain combination according to the application scenario of the network node at the preset time and the communication capability information of the network node includes:

inputting the application scenario of the network node at the preset time and the communication capability information of the network node into a reinforcement learning model, and determining an output result of the reinforcement learning model as the decision result.

Where the input of reinforcement learning includes an application scenario and communication capability information of a network node, as well as scheduling strategy. A Q table can be obtained through a reinforcement learning training, each row represents the input application scenario and the communication capability information of the network node, and each column represents the input decision result. The value of each cell in the Q table represents the reward expectation value for executing the corresponding decision result. Where the training can be stopped when the preset number of training times is reached, and the trained Q table is obtained. According to the reinforcement learning model, a corresponding reward expectation value when executing each decision result can be obtained, and a decision result corresponding to the largest reward expectation value is selected when determining the decision result. Where the decision result is activating the multi-domain combination of the five-domain resources.

The above method predicts the decision result through a reinforcement learning model, which can accurately determine the decision result corresponding to the application scenario of the current network node.

Optionally, the determining a decision result including a multi-domain combination according to the application scenario of the network node at the preset time and the communication capability information of the network node includes:

when the network node is in a static application scenario, and the communication capability information of the network node contains time domain resources and frequency domain resources, the multi-domain combination includes the time domain resources and frequency domain resources of the network node; or when the network node is in a moving application scenario and the communication capability information of the network node contains the time domain resources, the frequency domain resources and space domain resources, the decision result is activating the time domain resources, the frequency domain resources and the space domain resources of the network node; or when the network node is in an application scenario with interference and the communication capability information of the network node contains the time domain resources, the frequency domain resources, the space domain resources and code domain resources, the decision result is activating the time domain resources, the frequency domain resources, the space domain resources and the code domain resources of the network node; or when the network node is in an application scenario with multiple obstacles and the communication capability information of the network node contains the time domain resources, the frequency domain resources, the space domain resources, the code domain resources and time-delay Doppler domain resources, the decision result is activating the time domain resources, the frequency domain resources, the space domain resources, the code domain resources and the time-delay Doppler domain resources of the network node.

In this embodiment, the a network node is in a static application scenario refers to the network node being in a static or a relatively static application scenario, in this application scenario, if the communication capability information of the network node contains time domain resources and frequency domain resources, only the combination of the time domain resources and the frequency domain resources can be activated without activating the space domain resources, the code domain resources and the time-delay Doppler domain resources. Activating time domain resources refers to carrying data over different time periods for data transmission. Activating frequency domain resources refers to carrying data in different frequency bands for data transmission. Activation of the time domain resources and the frequency domain resources is carrying data in a certain time and a frequency band for data transmission.

For example, when the network node is in a static state, and if the network used by the network node is a single carrier network, and the network capacity changes, which means that the number of user terminals and the number of network nodes in the single carrier network exceed the set value, the capacity can be expanded by method of adding carriers or carrier aggregation. Or, if a current network is a time division multiple access network, the number of user terminals and the number of network nodes under some network nodes exceed a set value, the network can be switched to an orthogonal frequency division multiple access network to accommodate more user terminals and network nodes. Therefore, when the network node is in a static application scenario, the wireless communication network can be switched between time domain resources and the frequency domain resources by activating the time domain resources and the frequency domain resources.

In this embodiment, the a network node is in a moving application scenario refers to the network node being in a moving status or the spatial span range of multiple network nodes being large, or the electromagnetic environment between the network nodes being different, etc. In this application scenario, if the communication capability information of the network node contains time domain resources, frequency domain resources, and space domain resources, only the combination of the time domain resources, the frequency domain resources, and the space domain resources can be activated without activating the code domain resources and the time-delay Doppler domain resources. Activation of the space domain resources refers to carrying data on different antenna ports for data transmission.

For example, when the network node is in a moving state, if the network node uses broadband multi-antenna space division multiplexing to send and receive data and the distance between the network nodes is predicted to exceed a set value in the future, the wireless communication network can be switched in the time domain resources, frequency domain resources and space domain resources by activating the time domain resources, frequency domain resources and space domain resources. Specifically, the network can be switched to a narrowband single-transmitting and multiple-receiving communication protocol, which can enhance the power spectrum density and reduce the reception signal-to-noise ratio requirement.

In this embodiment, the a network node is in an application scenario with interference refers to the network node being in a scenario with interference, or with a complex electromagnetic environment, or which requires a high bit error rate for transmission. In this application scenario, if communication capability information of the network node includes time domain resources, frequency domain resources, space domain resources and code domain resources, only the combination of the time domain resources, the frequency domain resources, the space domain resources and the code domain resources can be activated without activating the time-delay Doppler domain resources. Activation of code domain resources refers to performing different encoding on data for data transmission.

For example, when the network node is in an application scenario with interference, a wireless communication network can be switched to a preset wireless communication network by activating a combination of the time domain resources, the frequency domain resources, the space domain resources and the code domain resources, such as code division multiple access communication protocol, which has the feature of anti-interference and can adjust the frequency band to the interference-free band or the frequency band with little interference to solve the situation of packet loss or communication failure due to interference.

In this embodiment, the a network node is in an application scenario with multiple obstacles refers to the network node being in a scenario with multiple obstacles, or a complex bypass environment, or a supersonic moving scenario. In this application scenario, if the communication capability information of the network node contains time domain resources, frequency domain resources, space domain resources, code domain resources and time-delay Doppler domain resources, the wireless communication network can be switched to a preset wireless communication network by activating the above five types of resources, such as orthogonal time-frequency-space communication protocol, which can carry the transmitted or received information in the time-delay Doppler domain to avoid the packet loss or to the communication failure when moving at supersonic speeds and when the obstacles are existed. Activation of delayed Doppler domain resources refers to carrying data at a different delay and Doppler frequency bias for data transmission.

In addition, the application scenario in which the network node is located also includes the network node moving to an area with no signal coverage, or a central control access point will fail in the future. In this application scenario, if the communication capability information of the network node contains time domain resources, frequency domain resources and space domain resources, a wireless communication network can be switched to a preset wireless communication network by activating the time domain resources, the frequency domain resources and the space domain resources, such as satellite relay communication protocol, which allows the generated radio waves to have a larger coverage area and longer communication distance to avoid packet loss or communication failure due to lack of signal coverage.

An application scenario of a network node also includes that the multicast service ratio between network nodes exceeds a preset value. In this application scenario, if the communication capability information of the network node includes time domain resources, frequency domain resources and space domain resources, a wireless communication network can be switched to a preset wireless communication network by activating the time domain resources, the frequency domain resources and the space domain resources, such as a resistance relay network unified forwarding protocol, which allows a node to achieve relay forwarding, thereby improving multicast communication rate and reliability.

Optionally, the method is applied to a network node, and the network node predicts the application scenario of the network node through a convolutional long-short-term memory hybrid neural network model; and the network node determines the multi-domain combination to be activated through a reinforcement learning model.

In this embodiment, the method can be applied to a network node, i.e., each network node is a network autonomous decision-making node to achieve a centreless ad hoc network communication method. In such method, a network node predicts an application scenario in which the network node is located through a convolutional long-short-term memory hybrid neural network, and determines a multi-domain combination to be activated by a reinforcement learning model after determining the application scenario. In the above process, the process of obtaining data information and processing the data information is performed through the network node.

Using a centreless ad hoc network structure can facilitate for the control and management of itself and has the advantage of high reliability.

Figure 3:
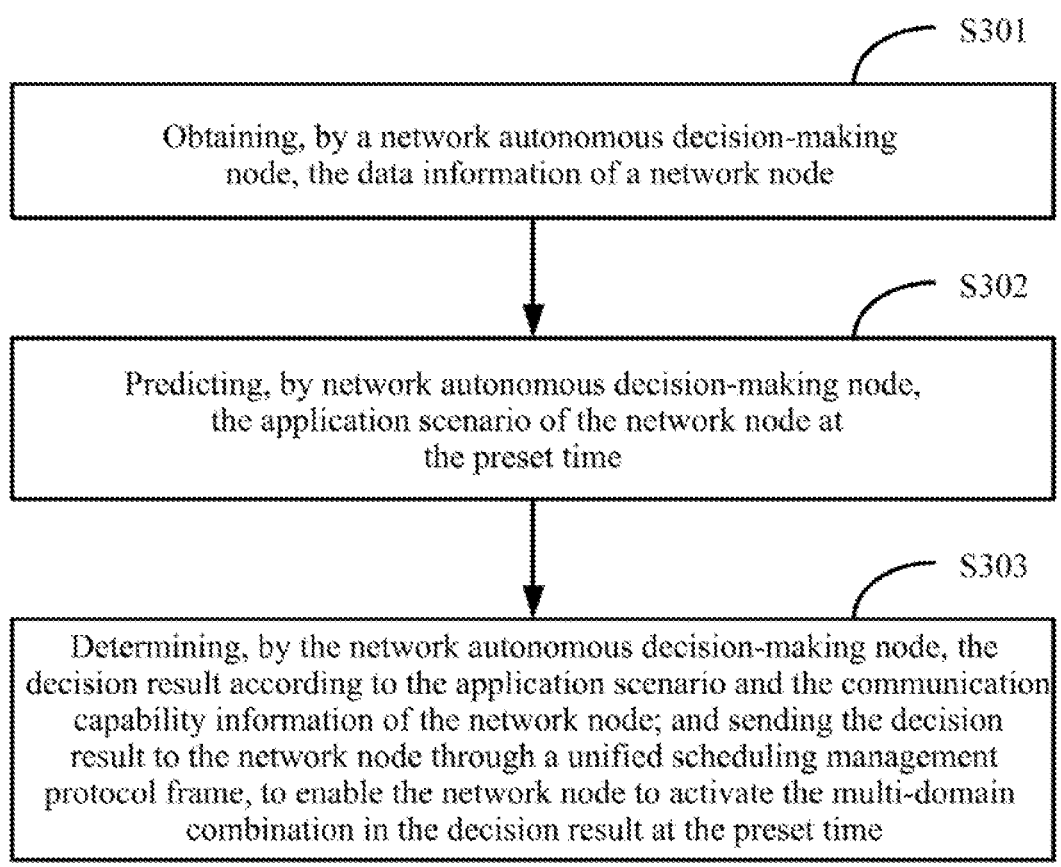
FIG. 3 is a schematic flowchart of another method for wireless intelligent decision-making communication provided by an embodiment of the present application.

As shown in FIG. 3, the method can also form a distributed network communication method, optionally, the method includes:

S301: obtaining, by a network autonomous decision-making node, the data information of a network node;

S302: predicting, by the network autonomous decision-making node, the application scenario of the network node at the preset time; and S303: determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

In this embodiment, the wireless network resources can also be scheduled through the network autonomous decision-making node. Specifically, the network node will obtain real-time changing data information, such as network status information, wireless channel information, scheduling request information and resource pre-occupancy indication information, and report the data information to the network autonomous decision-making node. After obtaining the data information, the network autonomous decision-making node can predict an application scenario of the network node, such as using a convolutional long-short-term memory hybrid neural network module. After obtaining the application scenario, a decision result can be obtained through a reinforcement learning model according to the application scenario and the communication capability information of the network node, and the decision result is sent to the network node in the form of a unified scheduling management protocol frame. In the communication method of forming a distributed network, the network autonomous decision-making node is used for receiving the data reported by the network node, and determining the decision result after processing.

FIG. 4(a) is a schematic structural diagram of a unified scheduling management protocol frame provided by an embodiment of the present application, as shown in FIG. 4(a), the unified scheduling management protocol frame includes a frame control field, an address format field and a frame body field.

The frame control field is used for storing the current wireless network type of the network node; the address format field is used for storing the network autonomous decision-making node address, a relay node address and a destination network node address; and the frame body field is used for storing the decision result.

As shown in FIG. 4(a), the frame control field and the address format field can be fixed bytes, and the frame body field can be variable length bytes. In this embodiment, there is no specific restriction on the number of bytes in each field.

The frame control field can store relevant information of the current wireless network of a network node, as shown in FIG. 4(b), the content stored in the frame control field includes a protocol type, a protocol version, an address format of the current network node, and other reserved frame control functions.

The address format field can be divided into several address fields, and the address information required for data transmission is stored in the corresponding address field. The frame body field is used for storing a decision result to enable the network node to execute the decision result.

As shown in FIG. 4(c), the address format field can be divided into network an autonomous decision-making node address, a receiving address, a sending address, and an extended address. Where the network autonomous decision-making node address is the address of the network autonomous decision-making node that sends the decision result; the receiving address is the address of a network node currently receiving the decision result, which can be the address of the relay node; and the sending address is the address of a network node currently sending the decision result, which can be the address of the relay node. The extended address can store other addresses, such as the destination address, for the address of the network node that eventually receives the decision result.

As shown in FIG. 4(c), the unified scheduling management frame format can also include a sequence control field, a service quality control field, a frame body field, and a checksum field. Where the sequence control field is used for storing sequence number identification of the frame; the service quality field is used for storing service category and business priority of the frame; and the checksum field is used for storing checksum value, which can be used for correctness detection.

By using the above unified scheduling management frame format, it can be ensured that a decision result is sent to a preset network node, and the network node can also obtain the decision result according to the received protocol frame.

The process of predicting an application scenario through a convolutional long-short-term memory hybrid neural network model and obtaining a decision result through a reinforcement learning model by a network autonomous decision-making node is the same as the process of predicting an application scenario and obtaining a decision result by a network node in the above embodiments, which will not be repeated here.

A network autonomous decision-making node predicts a decision result and sends the decision result to a network node, which can facilitate the management of the network node.

Figure 5:
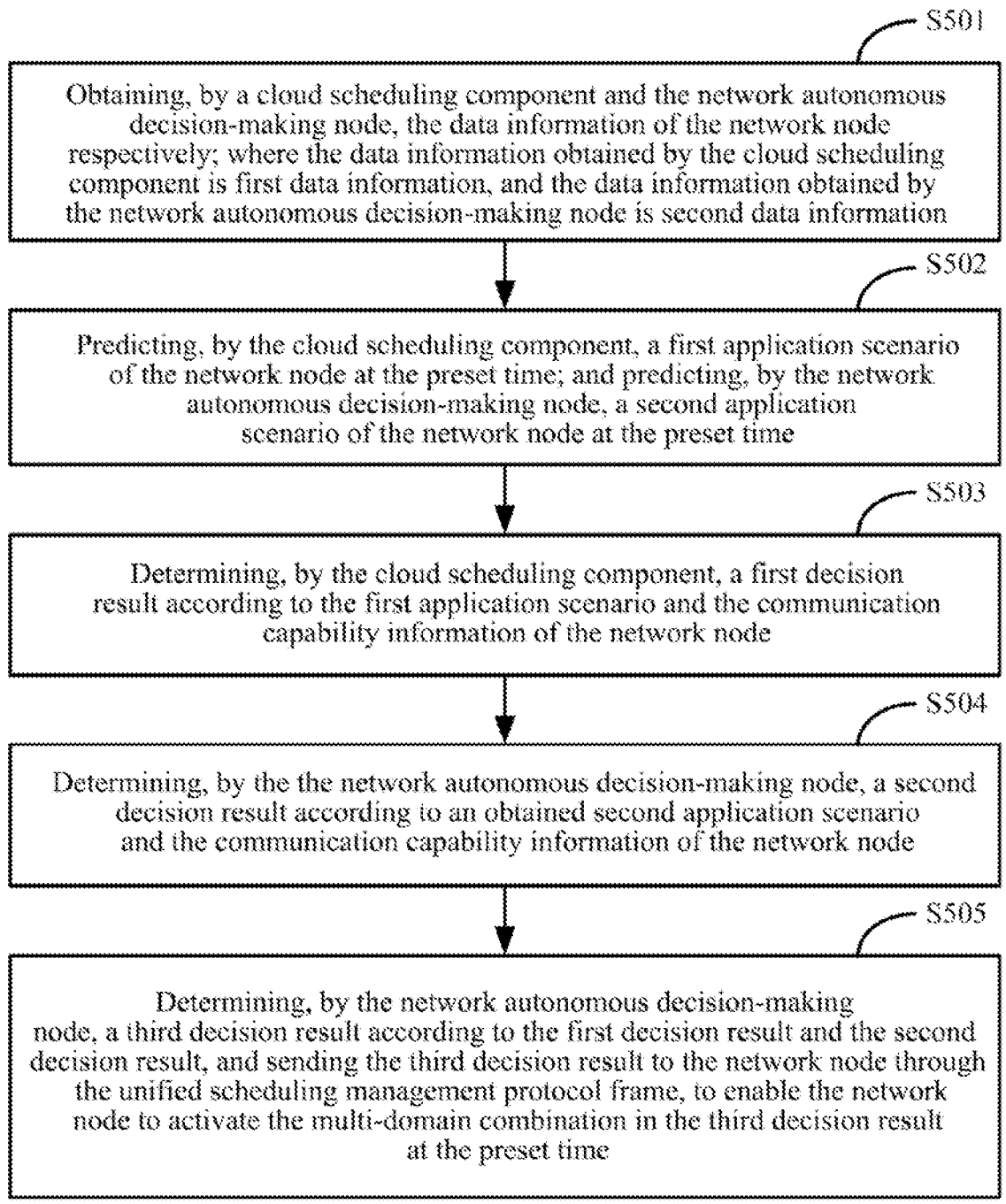
FIG. 5 is a schematic flowchart of another method for wireless intelligent decision-making communication provided by an embodiment of the present application.

As shown in FIG. 5, the method can also be applied to a cloud scheduling component and a network autonomous decision-making node, optionally, the method includes:

S501: obtaining, by a cloud scheduling component and the network autonomous decision-making node, the data information of the network node respectively; where the data information obtained by the cloud scheduling component is first data information, and the data information obtained by the network autonomous decision-making node is second data information; and where the first data information is long period data information, and the second data information is short period data information;

S502: predicting, by the cloud scheduling component, a first application scenario of the network node at the preset time; and predicting, by the network autonomous decision-making node, a second application scenario of the network node at the preset time;

S503: determining, by the cloud scheduling component, a first decision result according to the first application scenario and the communication capability information of the network node;

S504: determining, by the network autonomous decision-making node, a second decision result, according to an obtained second application scenario and the communication capability information of the network node; and S505: determining, by the network autonomous decision-making node, a third decision result according to the first decision result and the second decision result, and sending the third decision result to the network node through the unified scheduling management protocol frame, to enable the network node to activate the multi-domain combination in the third decision result at the preset time.

In this embodiment, the cloud scheduling component may include a primary cloud scheduling component and a plurality of backup cloud scheduling components. Similarly, for the network autonomous decision-making node in a region, a plurality of network autonomous decision-making nodes are also included. When the primary cloud scheduling component or the network autonomous decision-making node is abnormal, it can be replaced by a backup cloud scheduling component or other available network autonomous decision-making nodes.

Where the scheduling request information, the resource pre-occupancy indication information, the network status information and the wireless channel information obtained by a network node can be short period data information or long period data information. The short period data information can be millisecond data information with strong real-time capability. For example, the obtained scheduling request information, resource pre-occupancy indication information, network status information and wireless channel information is information that changes every 10 milliseconds. The long-period data information can be minute-level or long time data information. For example, the obtained scheduling request information, resource pre-occupancy indication information, network status information and wireless channel information is information that changes every 1 minute or even longer. The specific period length of the long period and the short period can be set according to actual needs, as long as the period length corresponding to the long period is longer than the period length corresponding to the short period.

Cloud scheduling components and network autonomous decision-making nodes can process obtained data information separately, and after processing, the cloud scheduling component can get a first decision result and the network autonomous decision-making node can gets a second decision result. The cloud scheduling component sends the first decision result to the network autonomous decision-making node, and the network autonomous decision-making node generates the third decision result and sends the third decision result to the network node. For example, for the same network node, the cloud scheduling component generates a first decision result of activating time domain resources and frequency domain resources in the third scheduling cycle in the future, and the network autonomous decision-making node generates a second decision result of activating time domain resources, frequency domain resources and space domain resources in the next scheduling cycle. Then the network autonomous decision-making node sends instruction information to the network node as following: activating time domain resources, frequency domain resources and space domain resources in the next scheduling cycle, and activating time domain resources and frequency domain resources in the third scheduling cycle. After receiving the instruction information, the network node will activate preset wireless network resources in the preset scheduling cycle.

The above method can process information in a long period and a short period by two levels of scheduling, i.e., the cloud scheduling component and the network autonomous decision-making node, respectively, which can ensure the network node activates preset wireless network resources smoothly at the preset time.

Figure 6:
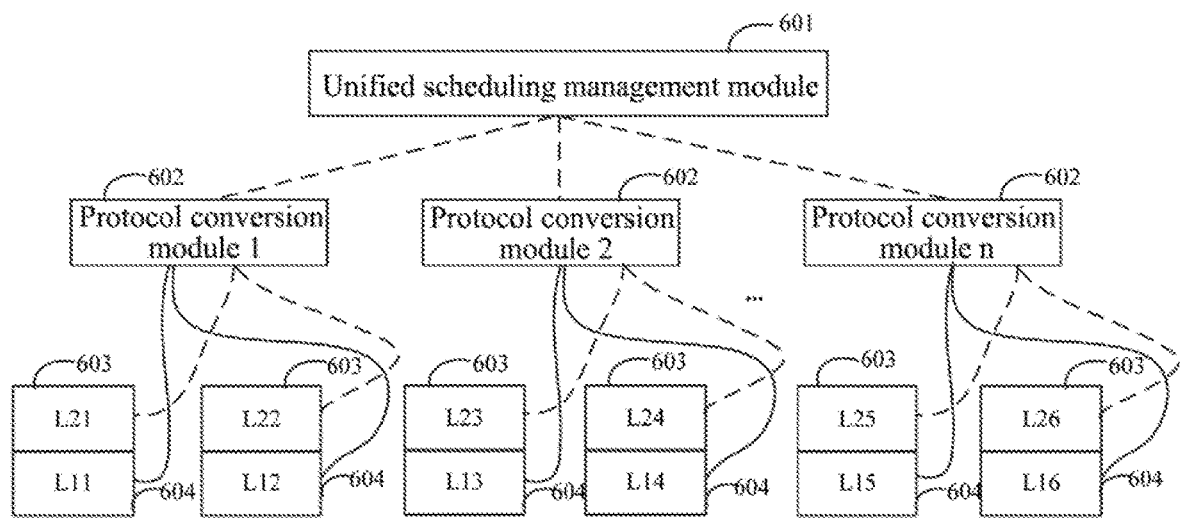
FIG. 6 is a schematic structural diagram of a protocol stack provided by an embodiment of the present application.

FIG. 6 is a schematic structural diagram of a protocol stack provided by an embodiment of the present application, which is applied in the network autonomous decision-making node and the cloud scheduling component.

Optionally, the cloud scheduling component and the network autonomous decision-making node both include a unified scheduling management module and at least one protocol conversion module; and the obtaining, by a cloud scheduling component and the network autonomous decision-making node, the data information of the network node respectively includes:

when a network type of the cloud scheduling component or the network autonomous decision-making node is inconsistent with a network type used by the network node transmitting data, switching, by the cloud scheduling component or the network autonomous decision-making node, the network type to a network type which is in line with the network node through the protocol conversion module;

correspondingly, the predicting, by the cloud scheduling component, a first application scenario of the network node at the preset time includes:

determining, by the unified scheduling management module in the cloud scheduling component, the first decision result according to the first application scenario; and correspondingly, the predicting, by the network autonomous decision-making node, a second application scenario of the network node at the preset time includes:

determining, by the unified scheduling management module in the network autonomous decision-making node, the second decision result according to the second application scenario.

In this embodiment, both the cloud scheduling component and the network autonomous decision-making node include a unified scheduling management module and at least one protocol conversion module through which the switching of the wireless networks of the cloud scheduling component and the network autonomous decision-making node can be realized. For example, when the network autonomous decision-making node is receiving the information sent by a network node, the wireless network used by the network node is a time division multiple access wireless network, while the wireless network used by the network autonomous decision-making node is an orthogonal frequency division multiple access wireless network, then the network autonomous decision-making node can convert the wireless network used by itself to the time division multiple access wireless network through the protocol conversion module, so as to realize information transmission with the network node.

The unified scheduling management module is used for determining the decision result according to the obtained application scenario and sending a determined decision result to the network node.

As shown in FIG. 6, the protocol stack includes a unified scheduling management module 601 and several protocol conversion modules, such as a plurality of protocol conversion modules 602. The unified scheduling management module 601 is connected to the service access points of each protocol conversion module 602 through service access points, respectively, where the service access points are logical interfaces and are the interfaces for communication between the upper and lower layers.

As shown in FIG. 6, the protocol stack further includes a data link layer L2 module 603 and a physical layer L1 module 604, where the physical layer L1 module is mainly used for performing operations, such as encoding and decoding, on data, so that the data can be transmitted without errors in the channel; and the data link layer L2 module is mainly used for achieving the control of accessing network resources to the corresponding air interface of the network node.

As shown in FIG. 6, the protocol conversion module 602 can convert and transmit data with several data link layer L2 modules 603 through L2 service access points, and can convert and transmit data with several physical layer L1 modules 604 through L1 service access points. For example, the protocol conversion module 602 can be connected to the service access points of data link layer L21 module 603 and data link layer L22 module 603 through L2 service access points, respectively for realizing data conversion and transmission. The L1 service access point can be connected to the allows service access points of physical layer L11 module 604 and physical layer L12 module 604, respectively, for realizing data conversion and transmission. Where data transmitted by the physical layer L1 module 604 and the data link layer L2 module 603 to the protocol conversion module 602 can ensure that the protocol conversion module 602 switches the network to a preset wireless communication module.

In the above protocol stack, the decision result can be determined by setting the unified scheduling management module, and when it is not consistent with the network type used by the sender of the data, the switch of the network types can be realized through the protocol conversion module, so as to ensure that the information sent by the network node can be received and a decision result can be generated according to the received information.

In addition, a cloud scheduling component and a network autonomous decision-making node can store obtained data information, and the process of storing data information is described in detail below.

Optionally, the cloud scheduling component and the network autonomous decision-making node both include a data storage module, and the method further includes:

storing, by the cloud scheduling component and the network autonomous decision-making node, the communication capability information of the network node in a blockchain; and storing, by the data storage module, the network status information, the wireless channel information, the scheduling request information, and the resource pre-occupancy indication information reported by the network node in a time sequence.

In this embodiment, communication ability information of the network nodes is the data information with low-frequency variation, where the low-frequency variation refers to the data information changes at a slower frequency. Data information with low-frequency variation can be stored in the blockchain. The communication capability information of the network node refers to all the communication capability information supported by the network node. Specifically, the blockchain is developed based on a super ledger platform, for storing correct network node information and communication capability information of the network node, and solve the problem of possible destruction or tampering of data information through the Byzantine fault tolerance (BFT) algorithm.

By using blockchain to save the communication capability information of the network node, which makes saved information has strong tamper proof, thereby ensuring that a decision result obtained according to the communication capability information of the network node is the decision result which is suitable for the network node being under current network state information, wireless channel information, network scheduling request information and resource pre-occupancy indication information.

The cloud scheduling component and the network autonomous decision-making node will store the received real-time changing data information in the data storage module, such as a time series database, in a chronological order. The time series database can be used for storing obtained real-time changing data as a separate table to realize continuous storage of data and reduce random reading operations.

When network status information, wireless channel information, scheduling request information and resource pre-occupancy indication information is stored through the above data storage module, they can be stored sequentially in the chronological order of data reception, so that the earlier network status information, wireless channel information, scheduling request information and resource pre-occupancy indication information can be processed to prevent the network node from being unable to activate preset wireless network resources for a long time.

Figure 7:
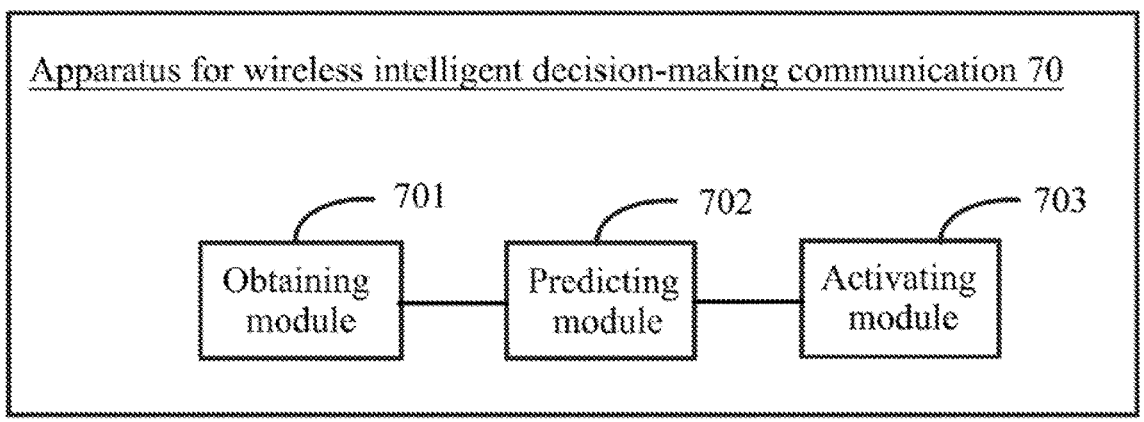
FIG. 7 is a schematic structural diagram of an apparatus for wireless intelligent decision-making communication provided by an embodiment of the present application.

FIG. 7 is a schematic structural diagram of an apparatus for wireless intelligent decision-making communication provided by an embodiment of the present application, which includes:

an obtaining module 701, configured to obtain data information of each network node; where the data information includes scheduling request information, resource pre-occupancy indication information, network status information, wireless channel information, and communication capability information of the network node; and a predicting module 702, configured to predict, for a network node, the scenario of the network node at the preset time according to the data information; and an activating module 703, configured to determine a decision result containing a multi-domain combination according to the application scenario of the network node at the preset time and the communication capability information of the network node, and activate the multi-domain combination of the network node at the preset time; where the multi-domain combination is corresponding to the application scenario of the network node.

The apparatus for wireless intelligent decision-making communication provided by the embodiment of the present application can realize the method for wireless intelligent decision-making communication of the above embodiment as shown in FIG. 2, and their realization principle and technical effect are similar, which will not be repeated here.

The embodiment of the present application further provides a system for wireless intelligent decision-making communication, which includes: a network autonomous decision-making node and a network node;

the network node is configured to send data information to the network autonomous decision-making node; the data information includes scheduling request information, resource pre-occupancy indication information, network status information, wireless channel information and communication capability information of the network node;

the network autonomous decision-making node is configured to obtain the data information of the network node, predict the application scenario of the network node at the preset time, and determine the decision result according to the application scenario and the communication capability information of the network node; and the network autonomous decision-making node is further configured to send the decision result to the network node through the unified scheduling management protocol frame to enable the network node to activate the multi-domain combination in the decision result at the preset time.

The system for wireless intelligent decision-making communication provided by the embodiment of the present application can realize the method for wireless intelligent decision-making communication of the above embodiment as shown in FIG. 3, and their realization principle and technical effect thereof are similar, which will not be repeated here.

Figure 8:
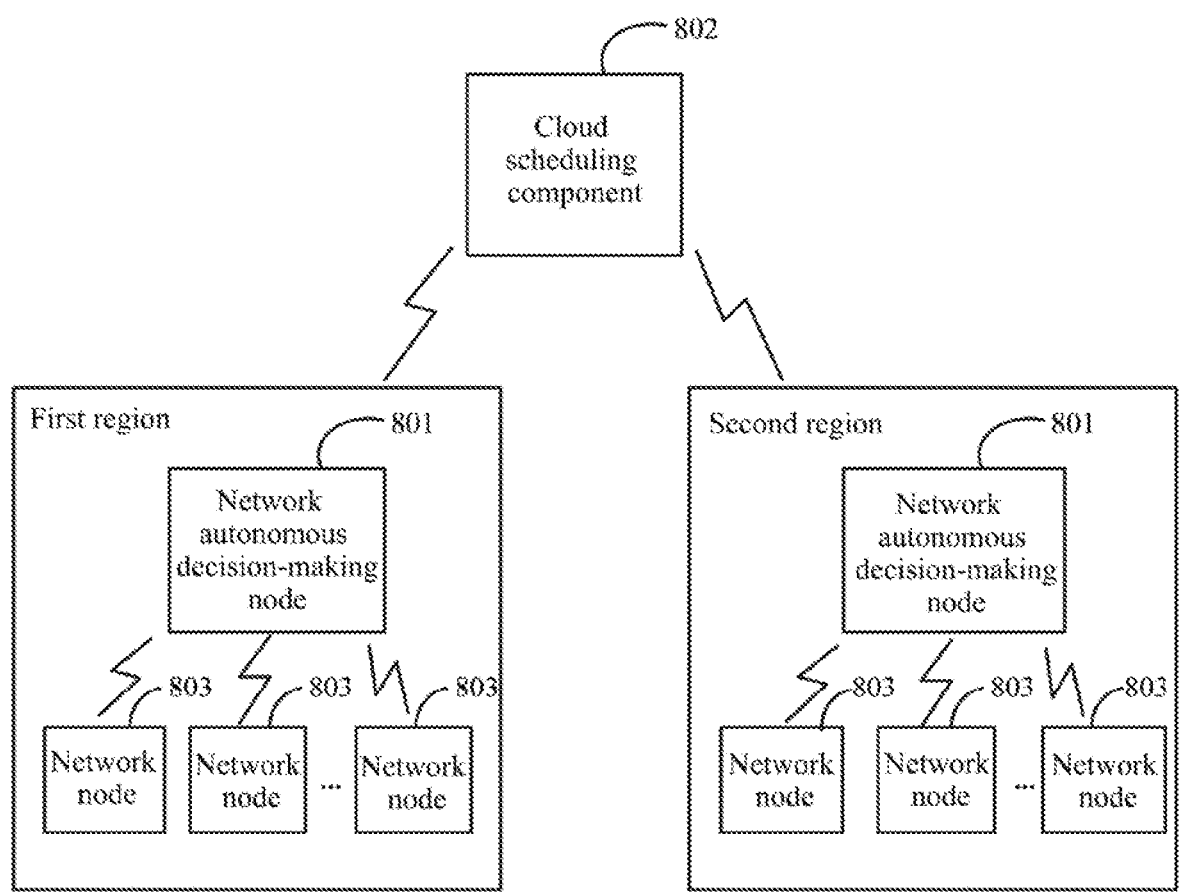
FIG. 8 is a system for wireless intelligent decision-making communication provided by an embodiment of the present application.

FIG. 8 is a system for wireless intelligent decision-making communication provided by an embodiment of the present application. As shown in FIG. 8, the system includes a network autonomous decision-making node 801, a cloud scheduling component 802, and a network node 803;

the cloud scheduling component 802 is configured to determine a first application scenario according to obtained first data information, and determine a first decision result according to the first application scenario;

the network autonomous decision-making node 801 is configured to determine a second application scenario according to obtained second data information, and determine a second decision result according to the second application scenario; and the network autonomous decision-making node 801 determines a third decision result according to the first decision result and the second decision result, and send the third decision result to the network node through an unified scheduling management protocol frame, to enable the network node to activate the multi-domain combination in the third decision result at the preset time;

where the first data information is long period data information; and the second data information is short period data information.

The system for wireless intelligent decision-making communication provided by the embodiment of the present application can realize the method for wireless intelligent decision-making communication of the above embodiment as shown in FIG. 5, and their realization principle and technical effect are similar, which will not be repeated here.

Finally, it should be noted that the above embodiments are only used for illustrating the technical solutions of the present application, rather than limiting them; although the present application has been described in detail with reference to the foregoing embodiments, those of ordinary skilled in the art should understand that it is still possible to modify the technical solutions recorded in the foregoing embodiments or to replace some or all of the technical features therein; and these modifications or replacements do not make the essence of the corresponding technical solutions deviate from the scope of the technical solutions of the embodiments of the present application.

What is claimed is:

1. A method for wireless intelligent decision-making communication, wherein the method comprises:
  obtaining data information of a network node; wherein the data information comprises scheduling request information, resource pre-occupancy indication information, network status information, wireless channel information, and communication capability information of the network node;
  predicting an application scenario of the network node at a preset time according to the data information, wherein the application scenario of the network node comprises one or more of the following: a network-node-static application scenario, a network-node-moving application scenario, an application scenario with interference, an application scenario with multiple obstacles, an application scenario where the network node moves to an area with no signal coverage, an application scenario where a central control access point will fail in the future, and an application scenario where a multicast service ratio between network nodes exceeds a preset value; and
  making a decision on wireless network resources available to the network node to obtain a decision result containing a multi-domain combination corresponding to the wireless network resources according to the application scenario of the network node at the preset time and the communication capability information of the network node, and activating the wireless network resources corresponding to the multi-domain combination of the network node at the preset time; wherein the multi-domain combination comprises a combination of at least two of a time domain, a frequency domain, a space domain, a code domain and a time-delay Doppler domain, and the multi-domain combination is corresponding to the application scenario of the network node.

2. The method according to claim 1, wherein the predicting the application scenario of the network node at the preset time according to the data information comprises:
  predicting network node change information of the network node according to the data information; and
  determining the application scenario of the network node according to the network node-change information.

3. The method according to claim 2, wherein the making the decision on wireless network resources available to the network node to obtain the decision result containing the multi-domain combination corresponding to the wireless network resources according to the application scenario of the network node at the preset time and the communication capability information of the network node comprises:
  inputting the application scenario of the network node at the preset time and the communication capability information of the network node into a reinforcement learning model, and determining an output result of the reinforcement learning model as the decision result.

4. The method according to claim 3, wherein the method is applied to the network node, and the network node predicts the application scenario of the network node through a convolutional long-short-term memory hybrid neural network model, and the network node determines the wireless network resources corresponding to the multi-domain combination to be activated through the reinforcement learning model.

5. The method according to claim 3, wherein the obtaining data information of a network node comprises:
  obtaining, by a network autonomous decision-making node, the data information of the network node;
  correspondingly, the predicting an application scenario of the network node at a preset time according to the data information comprises:
  predicting, by the network autonomous decision-making node, the application scenario of the network node at the preset time; and
  correspondingly, the determining a decision result containing a multi-domain combination according to the application scenario of the network node at the preset time and the communication capability information of the network node, and activating the multi-domain combination of the network node at the preset time comprises:
  determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

6. The method according to claim 2, wherein the making the decision on wireless network resources available to the network node to obtain the decision result containing the multi-domain combination corresponding to the wireless network resources according to the application scenario of the network node at the preset time and the communication capability information of the network node comprises one or more of the following:
  when the network node is in the application scenario where the network node moves to the area with no signal coverage or the central control access will fail in the future and the communication capability information of the network node contains time domain resources, frequency domain resources and space domain resources, the decision result is activating the time domain resources, the frequency domain resources and the space domain resources of the network node;
  when the network node is in the application scenario where the multicast service ratio between network nodes exceeds the preset value and the communication capability information of the network node includes the time domain resources, the frequency domain resources and the space domain resources, the decision result is activating the time domain resources, the frequency domain resources and the space domain resources of the network node;
  when the network node is in the network-node-static application scenario and the communication capability information of the network node contains the time domain resources and the frequency domain resources, the decision result is activating the time domain resources and the frequency domain resources of the network node;

when the network node is in the network-node-moving application and the communication capability information of the network node contains the time domain resources, the frequency domain resources and space domain resources, the decision result is activating the time domain resources, the frequency domain resources and the space domain resources of the network node;

when the network node is in the application scenario with interference and the communication capability information of the network node contains the time domain resources, the frequency domain resources, the space domain resources and code domain resources, the decision result is activating the time domain resources, the frequency domain resources, the space domain resources and the code domain resources of the network node; and when the network node is in the application scenario with multiple obstacles and the communication capability information of the network node contains the time domain resources, the frequency domain resources, the space domain resources, the code domain resources and time-delay Doppler domain resources, the decision result is activating the time domain resources, the frequency domain resources, the space domain resources, the code domain resources and the time-delay Doppler domain resources of the network node.

7. The method according to claim 2, wherein the method is applied to the network node, and the network node predicts the application scenario of the network node through a convolutional long-short-term memory hybrid neural network model, and the network node determines the wireless network resources corresponding to the multi-domain combination to be activated through a reinforcement learning model.

8. The method according to claim 2, wherein the obtaining data information of a network node comprises:
   obtaining, by a network autonomous decision-making node, the data information of the network node;
   correspondingly, the predicting an application scenario of the network node at a preset time according to the data information comprises:
   predicting, by the network autonomous decision-making node, the application scenario of the network node at the preset time; and
   correspondingly, the determining a decision result containing a multi-domain combination according to the application scenario of the network node at the preset time and the communication capability information of the network node, and activating the multi-domain combination of the network node at the preset time comprises:
   determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

9. The method according to claim 1, wherein the making the decision on wireless network resources available to the network node to obtain the decision result containing the multi-domain combination corresponding to the wireless network resources according to the application scenario of the network node at the preset time and the communication capability information of the network node comprises:
   inputting the application scenario of the network node at the preset time and the communication capability information of the network node into a reinforcement learning model, and determining an output result of the reinforcement learning model as the decision result.

10. The method according to claim 9, wherein the method is applied to the network node, and the network node predicts the application scenario of the network node through a convolutional long-short-term memory hybrid neural network model, and the network node determines the wireless network resources corresponding to the multi-domain combination to be activated through the reinforcement learning model.

11. The method according to claim 9, wherein the obtaining data information of a network node comprises:
   obtaining, by a network autonomous decision-making node, the data information of the network node;
   correspondingly, the predicting an application scenario of the network node at a preset time according to the data information comprises:
   predicting, by the network autonomous decision-making node, the application scenario of the network node at the preset time; and
   correspondingly, the determining a decision result containing a multi-domain combination according to the application scenario of the network node at the preset time and the communication capability information of the network node, and activating the multi-domain combination of the network node at the preset time comprises:
   determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

12. The method according to claim 1, wherein the determining a decision result containing a multi-domain combination according to the application scenario of the network node at the preset time and the communication capability information of the network node comprises one or more of the following:
   when the network node is in the application scenario where the network node moves to the area with no signal coverage or the central control access will fail in the future and the communication capability information of the network node contains time domain resources, frequency domain resources and space domain resources, the decision result is activating the time domain resources, the frequency domain resources and the space domain resources of the network node;
   when the network node is in the application scenario where the multicast service ratio between network nodes exceeds the preset value and the communication capability information of the network node includes the time domain resources, the frequency domain resources and the space domain resources, the decision result is activating the time domain resources, the frequency domain resources and the space domain resources of the network node;
   when the network node is in the network-node-static static application scenario and the communication capability information of the network node contains the time domain resources and the frequency domain resources, the decision result is activating the time domain resources and the frequency domain resources of the network node;

when the network node is in a moving the network-node-moving application scenario and the communication capability information of the network node contains the time domain resources, the frequency domain resources and the space domain resources, the decision result is activating the time domain resources, the frequency domain resources and the space domain resources of the network node;

when the network node is in the application scenario with interference and the communication capability information of the network node contains the time domain resources, the frequency domain resources, the space domain resources and code domain resources, the decision result is activating the time domain resources, the frequency domain resources, the space domain resources and the code domain resources of the network node; and when the network node is in the application scenario with multiple obstacles and the communication capability information of the network node contains the time domain resources, the frequency domain resources, the space domain resources, the code domain resources and time-delay Doppler domain resources, the decision result is activating the time domain resources, the frequency domain resources, the space domain resources, the code domain resources and the time-delay Doppler domain resources of the network node.

13. The method according to claim 12, wherein the obtaining data information of a network node comprises:

obtaining, by a network autonomous decision-making node, the data information of the network node;

correspondingly, the predicting an application scenario of the network node at a preset time according to the data information comprises:

predicting, by the network autonomous decision-making node, the application scenario of the network node at the preset time; and correspondingly, the determining a decision result containing a multi-domain combination according to the application scenario of the network node at the preset time and the communication capability information of the network node, and activating the multi-domain combination of the network node at the preset time comprises:

determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

14. The method according to claim 1, wherein the method is applied to the network node, and the network node predicts the application scenario of the network node through a convolutional long-short-term memory hybrid neural network model, and the network node determines the wireless network resources corresponding to the multi-domain combination to be activated through a reinforcement learning model.

15. The method according to claim 1, wherein the obtaining data information of a network node comprises:

obtaining, by a network autonomous decision-making node, the data information of the network node;

correspondingly, the predicting an application scenario of the network node at a preset time according to the data information comprises:

predicting, by the network autonomous decision-making node, the application scenario of the network node at the preset time; and correspondingly, the determining a decision result containing a multi-domain combination according to the application scenario of the network node at the preset time and the communication capability information of the network node, and activating the multi-domain combination of the network node at the preset time comprises:

determining, by the network autonomous decision-making node, the decision result according to the application scenario and the communication capability information of the network node; and sending the decision result to the network node through a unified scheduling management protocol frame, to enable the network node to activate the multi-domain combination in the decision result at the preset time.

16. The method according to claim 1, wherein the obtaining data information of a network node comprises:

obtaining, by a cloud scheduling component and a network autonomous decision-making node, the data information of the network node respectively; wherein the data information obtained by the cloud scheduling component is first data information, and the data information obtained by the network autonomous decision-making node is second data information; and wherein the first data information is long period data information, and the second data information is short period data information;

correspondingly, the predicting an application scenario of the network node at a preset time according to the data information comprises:

predicting, by the cloud scheduling component, a first application scenario of the network node at the preset time; and predicting, by the network autonomous decision-making node, a second application scenario of the network node at the preset time; and correspondingly, the determining a decision result containing a multi-domain combination according to the application scenario of the network node at the preset time and the communication capability information of the network node, and activating the multi-domain combination of the network node at the preset time comprises:

determining, by the cloud scheduling component, a first decision result according to the first application scenario and the communication capability information of the network node;

determining, by the network autonomous decision-making node, a second decision result according to an obtained second application scenario and the communication capability information of the network node; and determining, by the network autonomous decision-making node, a third decision result according to the first decision result and the second decision result, and sending the third decision result to the network node through the unified scheduling management protocol frame, to enable the network node to activate the multi-domain combination in the third decision result at the preset time.

17. The method according to claim 16, wherein the cloud scheduling component and the network autonomous decision-making node both comprise a unified scheduling management module and at least one protocol conversion module; and the obtaining, by a cloud scheduling component and a network autonomous decision-making node, the data information of the network node respectively comprises:
  when a network type of the cloud scheduling component or the network autonomous decision-making node is inconsistent with a network type used by the network node transmitting data, switching, by the cloud scheduling component or the network autonomous decision-making node, the network type to a network type which is in line with the network node through the protocol conversion module;
  correspondingly, the predicting, by the cloud scheduling component, a first application scenario of the network node at the preset time comprises:
  determining, by the unified scheduling management module in the cloud scheduling component, the first decision result according to the first application scenario; and
  correspondingly, the predicting, by the network autonomous decision-making node, a second application scenario of the network node at the preset time comprises:
  determining, by the unified scheduling management module in the network autonomous decision-making node, the second decision result according to the second application scenario.

18. The method according to claim 16, wherein the cloud scheduling component and the network autonomous decision-making node both comprise a data storage module, after obtaining, by the cloud scheduling component and the network autonomous decision-making node, the data information of the network node respectively, the method further comprises:
  storing, by the cloud scheduling component and the network autonomous decision-making node, the communication capability information of the network node in a blockchain; and
  storing, by the data storage module, the network status information, the wireless channel information, the scheduling request information, and the resource pre-occupancy indication information reported by the network node in a time sequence.

19. An apparatus for wireless intelligent decision-making communication, comprising:
  at least one processor;
  a memory connected with the at least one processor; wherein
  instructions, when executed by the at least one processor, cause the at least one processor to:
  obtain data information of each network node; wherein the data information comprises scheduling request information, resource pre-occupancy indication information, network status information, wireless channel information, and communication capability information of the network node;
  predict, for the network node, a scenario of the network node at a preset time according to the data information, wherein the application scenario of the network node comprises one or more of the following: a network-node-static application scenario, a network-node-moving application scenario, an application scenario with interference, an application scenario with multiple obstacles, an application scenario where the network node moves to an area with no signal coverage, an application scenario where a central control access point will fail in the future, and an application scenario where a multicast service ratio between network nodes exceeds a preset value; and
  make a decision on wireless network resources available to the network node to obtain a decision result containing a multi-domain combination corresponding to the wireless network resources according to an application scenario of the network node at the preset time and the communication capability information of the network node, and activate the wireless network resources corresponding to the multi-domain combination of the network node at the preset time; wherein the multi-domain combination comprises a combination of at least two of a time domain, a frequency domain, a space domain, a code domain and a time-delay Doppler domain, and the multi-domain combination is corresponding to the application scenario of the network node.

20. The apparatus according to claim 19, wherein the predicting the application scenario of the network node at the preset time according to the data information comprises:
  predicting network node change information of the network node according to the data information; and
  determining the application scenario of the network node according to the network node-change information.

21. The apparatus according to claim 20, wherein the making the decision on wireless network resources available to the network node to obtain the decision result containing the multi-domain combination corresponding to the wireless network resources according to the application scenario of the network node at the preset time and the communication capability information of the network node comprises one or more of the following:
  when the network node is in the application scenario where the network node moves to the area with no signal coverage or the central control access will fail in the future and the communication capability information of the network node contains time domain resources, frequency domain resources and space domain resources, the decision result is activating the time domain resources, the frequency domain resources and the space domain resources of the network node;
  when the network node is in the application scenario where the multicast service ratio between network nodes exceeds the preset value and the communication capability information of the network node includes the time domain resources, the frequency domain resources and the space domain resources, the decision result is activating the time domain resources, the frequency domain resources and the space domain resources of the network node;
  when the network node is in the network-node-static application scenario and the communication capability information of the network node contains the time domain resources and the frequency domain resources, the decision result is activating the time domain resources and the frequency domain resources of the network node;
  when the network node is in the network-node-moving application and the communication capability information of the network node contains the time domain resources, the frequency domain resources and space domain resources, the decision result is activating the time domain resources, the frequency domain resources and the space domain resources of the network node;

when the network node is in the application scenario with interference and the communication capability information of the network node contains the time domain resources, the frequency domain resources, the space domain resources and code domain resources, the decision result is activating the time domain resources, the frequency domain resources, the space domain resources and the code domain resources of the network node; and when the network node is in the application scenario with multiple obstacles and the communication capability information of the network node contains the time domain resources, the frequency domain resources, the space domain resources, the code domain resources and time-delay Doppler domain resources, the decision result is activating the time domain resources, the frequency domain resources, the space domain resources, the code domain resources and the time-delay Doppler domain resources of the network node.

* * * * *